United States Patent
Rao et al.

(10) Patent No.: US 9,754,035 B2
(45) Date of Patent: Sep. 5, 2017

(54) RECURSIVE UNIQUE USER METRICS IN REAL TIME

(71) Applicant: Excalibur LP, LLC, New York, NY (US)

(72) Inventors: Supreeth Rao, Sunnyvale, CA (US); Sunil Kumar Gupta, Sunnyvale, CA (US); Chetan Nadgire, Sunnyvale, CA (US)

(73) Assignee: Excalibur LP, LCC, Sunnyvale, CA (US)

( * ) Notice: Subject to any disclaimer, the term of this patent is extended or adjusted under 35 U.S.C. 154(b) by 568 days.

(21) Appl. No.: 14/175,667

(22) Filed: Feb. 7, 2014

(65) Prior Publication Data

US 2015/0227628 A1 Aug. 13, 2015

(51) Int. Cl.
*G06F 17/30* (2006.01)
(52) U.S. Cl.
CPC .............................. *G06F 17/30867* (2013.01)
(58) Field of Classification Search
CPC ............... G06F 17/30; G06F 17/30498; G06F 17/30867; G06F 11/079; G06F 17/30734; G06F 17/30598; G06F 17/30705; G06F 17/30643; G06F 17/30327
USPC ............... 707/769, 722, 778, 737, 736, 777, 707/E17.012, 798, 956, 751, 829
See application file for complete search history.

(56) References Cited

U.S. PATENT DOCUMENTS

| | | | | |
|---|---|---|---|---|
| 2003/0050915 | A1* | 3/2003 | Allemang | G06F 17/30731 |
| 2008/0319941 | A1* | 12/2008 | Gollapudi | G06F 17/30616 |
| 2010/0114842 | A1* | 5/2010 | Forman | G06F 17/3033 |
| | | | | 707/692 |
| 2012/0299925 | A1* | 11/2012 | Najork | G06T 11/206 |
| | | | | 345/440 |

(Continued)

FOREIGN PATENT DOCUMENTS

CN 102646097 A 8/2012

OTHER PUBLICATIONS

Flajolet et al. HyperLogLog: the analysis of a near-optimal cardinality estimation algorithm, 20pgs., 2007 Conference on Analysis of Algorithms.

(Continued)

*Primary Examiner* — Robert Beausoliel, Jr.
*Assistant Examiner* — Pedro J Santos
(74) *Attorney, Agent, or Firm* — Brinks Gilson & Lione

(57) ABSTRACT

A system can provide unique user metrics associated with a node in a hierarchy and the node's decedents in real time. This can occur by merging sketches of the node and its decedents to form a merged sketch, and retrieving the unique user metrics from the merged sketch. The sketches and the merged sketch may each be a separate data form, such as a hash. The hierarchy may include an online content taxonomy and the sketches of each node may include unique user metrics associated with the node, such as user interaction metrics associated with a category of content of the node. The system may build sketches for the nodes of a hierarchy, associate each sketch with its ancestor sketches, (Continued)

invert the associations, tie corresponding descendant sketches of an ancestor sketch based on the inversions, and merge the descendant sketches with their ancestor sketches to generate the merged sketches.

19 Claims, 9 Drawing Sheets

(56) References Cited

U.S. PATENT DOCUMENTS

2014/0258248 A1* 9/2014 Lambright ........ G06F 17/30135
　　　　　　　　　　　　　　　　　　　707/693

OTHER PUBLICATIONS

Sketch (mathematics) http://en.wikipedia.org/w/index.pph?title=Sketch>(mathematics)&olddid=555217264. 2pp., retrieved Feb. 10, 2014.

* cited by examiner

RECURSIVE UNIQUE USER METRICS IN REAL TIME

BACKGROUND

This application relates to retrieving recursive unique user metrics in real time, such as instantly or within a period of time with no significant delays. This application also relates to techniques for providing such metrics in real time using sketches.

Recursive unique user metrics can include unique user metrics on objects that have recursive associations with other objects. For example, recursive unique user metrics can include recursive unique user metrics of a node in a hierarchy. For example, recursive unique user metrics can include recursive unique user metrics of a node in an online taxonomy, such as an online content taxonomy. An online content taxonomy may include nodes that represent respective content categories. For example, a recursive unique user metric for a node representing winter sports may include an amount of unique users querying winter sports and other categories descending from winter sports in an online content taxonomy, such as the categories of skiing and skating.

Obtaining recursive unique user metrics may be very complex and may require a great amount of lookups within layers of data logs. The complexity becomes even greater with an increased width and/or a height of a hierarchy of data. For example, some content providers and Internet services may have content hierarchies including over ten levels and hundreds of thousands of nodes. Although, the task of providing recursive unique user metrics seems daunting with such numbers, it can be done with enough time and resources.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Subject matter will now be described more fully hereinafter with reference to the accompanying drawings, which form a part hereof, and which show, by way of illustration, specific examples. Subject matter may, however, can be embodied in a variety of different forms and, therefore, covered or claimed subject matter is intended to be construed as not being limited to any examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Overview of Recursive Unique User Metrics in Real Time

Described herein are systems, products, and methods for providing unique user metrics associated with a node in a hierarchy and the node's decedents in real time (such as instantly or within a period of time with no significant delays). In other words, described herein are ways to provide recursive unique user metrics in a hierarchy of data. This can occur by merging sketches of a node and its decedents to form a merged sketch, and then retrieving the recursive unique user metrics from the merged sketch.

The hierarchy may include an online content taxonomy and the sketches of each node may include unique user metrics associated with the node, such as user interaction metrics associated with a category of online content associated with the node. Also, the category may be another type of online category, such as a media type for delivering or presenting content. Where the online category is a content category, the content category can be a topic.

In an example, the system may build sketches associated with the nodes of a hierarchy, associate each sketch with its respective ancestor sketches, invert the associations, tie corresponding descendant sketches of an ancestor sketch based on the inversions, and merge the descendant sketches with their respective ancestor sketches to generate the merged sketches. Also, in an example, the sketches and the merged sketches may each be separate data forms, such as separate hashes. Also, the merged sketches may be normalized sketches.

DESCRIPTION OF THE DRAWINGS

Figure 1:
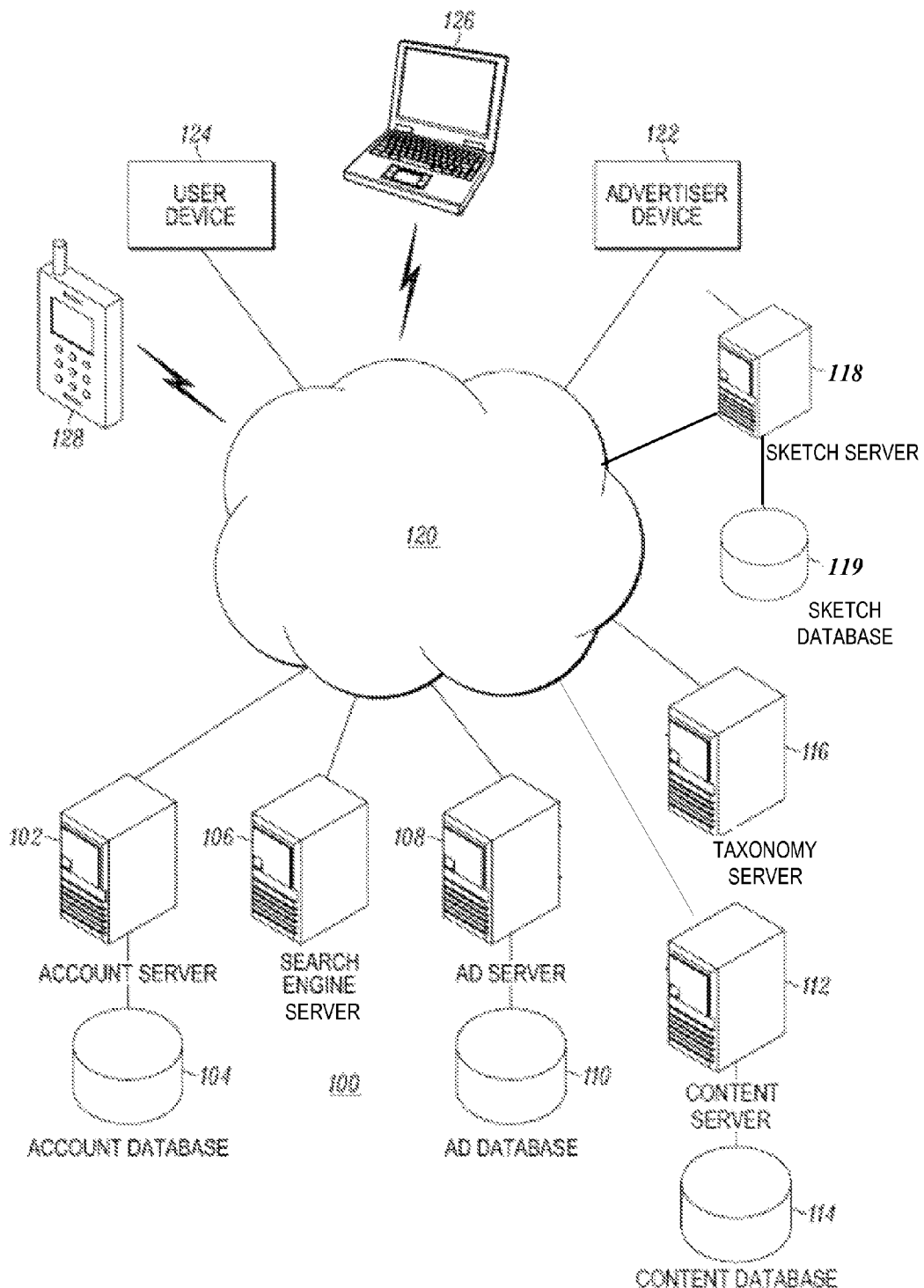
FIG. 1 illustrates a block diagram of an example information system that includes example devices of a network that can communicatively couple with an example system that provides recursive unique user metrics in real time.

FIG. 1 illustrates a block diagram of an example information system that includes example devices of a network that can communicatively couple with an example system that provides recursive unique user metrics in real time. The information system 100 in the example of FIG. 1 includes an account server 102, an account database 104, a search engine server 106, an ad server 108, an ad database 110, a content database 114, a content server 112, a taxonomy server 116, a sketch server 118, and a sketch database 119. The aforementioned servers and databases can be communicatively coupled over a network 120.

The information system 100 may be accessible over the network 120 by advertiser devices, such as an advertiser device 122 and by user devices, such as a user device 124. In various examples of such an online information system, users may search for and obtain content from sources over the network 120, such as obtaining content from the search engine server 106, the ad server 108, the ad database 110, the content database 114, the content server 112, and the taxonomy server 116. Advertisers may provide advertisements for placement on electronic properties, such as web pages, and other communications sent over the network to user devices, such as the user device 124. The online information system can be deployed and operated by an online provider, such as Yahoo! Inc.

The account server 102 stores account information for advertisers. The account server 102 is in data communication with the account database 104. Account information may include database records associated with each respective advertiser. Any suitable information may be stored, maintained, updated and read from the account database 104 by the account server 102. Examples include advertiser identification information, advertiser security information, such as passwords and other security credentials, account balance information, and information related to content associated with their ads, and user interactions associated with their ads and associated content. Also, examples include analytics data related to their ads and associated content and user interactions with the aforementioned. The account information may also be logged in data logs (such as logs 516), and such logs may be communicated to the sketch server 118 for processing. These logs can be input for the building of sketches.

The account server 102 may be implemented using any suitable device. The account server 102 may be implemented as a single server, a plurality of servers, or any other type of computing device known in the art. Access to the account server 102 can be accomplished through a firewall which protects the account management programs and the account information from external tampering. Additional security may be provided via enhancements to the standard communications protocols, such as Secure HTTP (HTTPS) or the Secure Sockets Layer (SSL). Such security may be applied to the servers of FIG. 1, for example.

The account server 102 may provide an advertiser front end to simplify the process of accessing the account information of an advertiser. The advertiser front end may be a program, application, or software routine that forms a user interface. In a particular example, the advertiser front end is accessible as a website with electronic properties that an accessing advertiser may view on an advertiser device, such as the advertiser device 122. The advertiser may view and edit account data and advertisement data using the advertiser front end. After editing the advertising data, the account data may then be saved to the account database 104.

Also, recursive unique user metrics for different ad and/or content categories may be viewed in real time using the advertiser front end. The advertiser front end may be a client-side application, such as a client-side application 503 running on the client device 501. The script and/or applet 505 may be a part of this front end and may render access points for retrieval of the recursive unique user metrics. Also, the script and/or applet 505 may manage the retrieval of the recursive unique user metrics and other metrics. In an example, this front end may include a graphical display of fields for selecting a category or a combination of categories. The front end, via the script and/or applet, can request the recursive unique user metrics for the category or the combination of categories. The metrics can then be displayed, such as displayed according to the script and/or applet 505.

The search engine server 106 may be a computer system, multiple servers, or any other computing device known in the art. Alternatively, the search engine server 106 may be a computer program, instructions, or software code stored on a computer-readable storage medium that runs on a processor of a single server, a plurality of servers, or any other type of computing device known in the art. The search engine server 106 may be accessed by user devices, such as the user device 124 operated by a user over the network 120. Access may be through graphical access points. For example, query entry box 240b of FIG. 2 may be an access point for the user to submit a search query to the search server 106. Any search queries submitted or other user interactions with the search server 106 can be logged in data logs (such as the logs 516), and such logs may be communicated to the sketch server 118 for processing. These logs can be input for the building of sketches.

Figure 2:
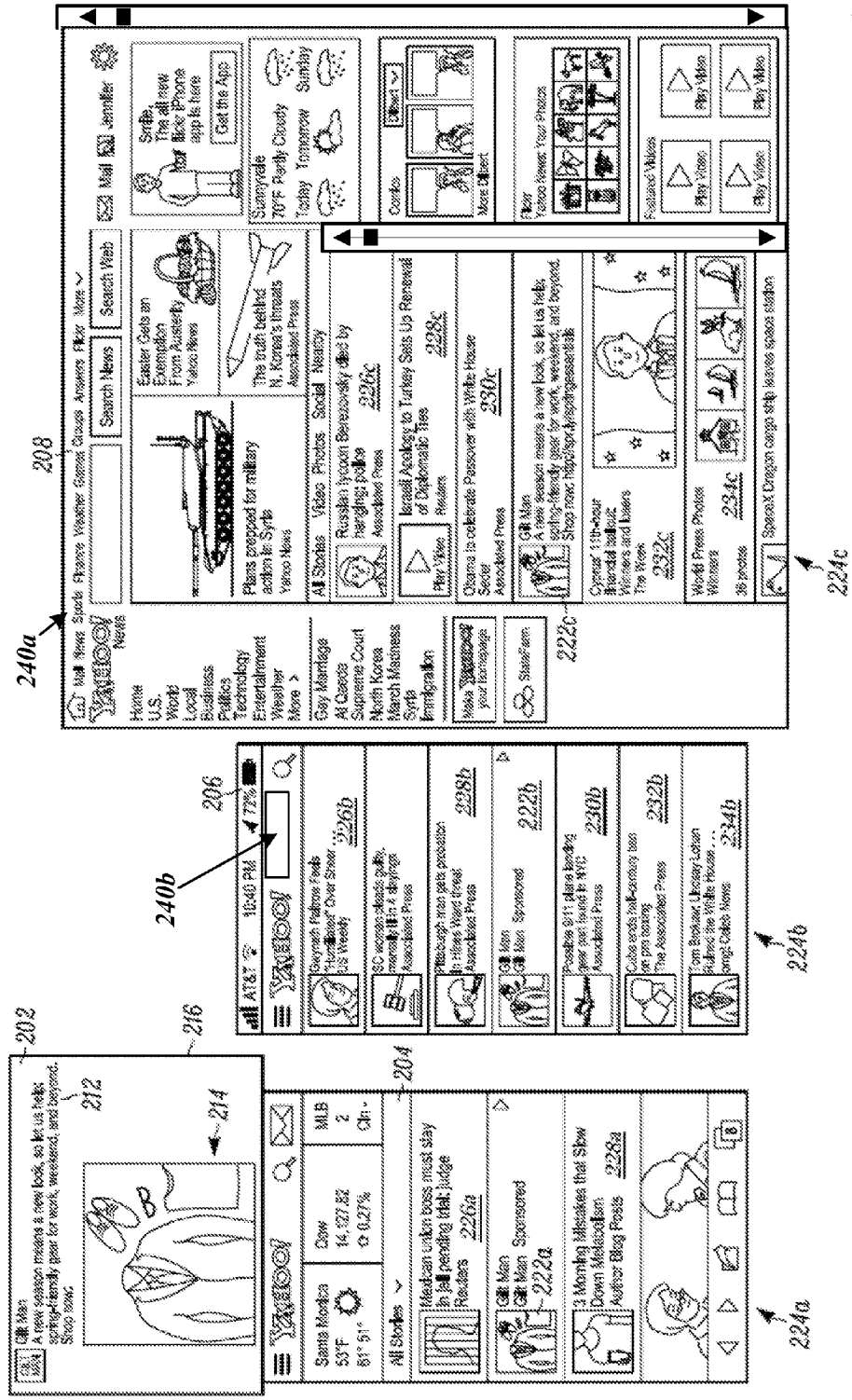
FIG. 2 illustrates displayed ad items and content items of example screens rendered by client-side applications (including a web browser).
Figure 3:
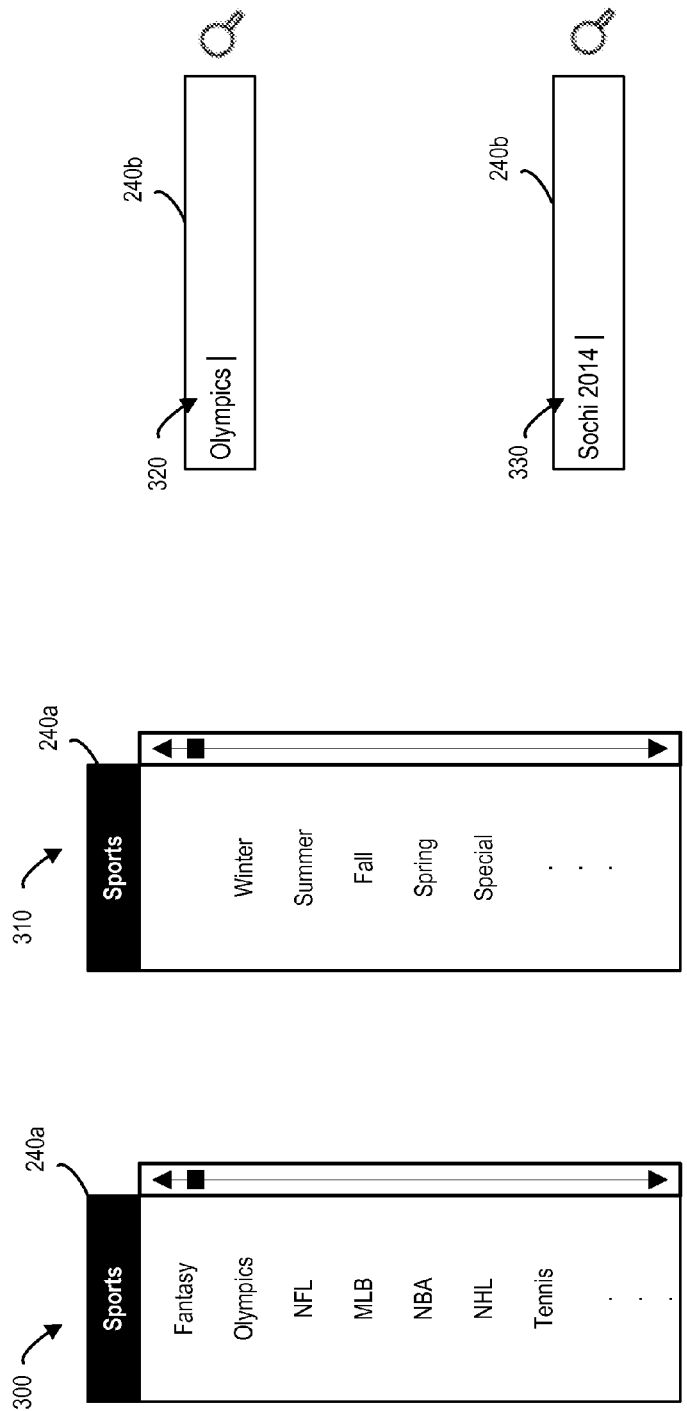
FIG. 3 illustrates example graphical elements that may appear in example screens rendered by client-side applications, such as the screens in FIG. 2.

FIG. 3 illustrates two search query entries 320 and 330 entered into the query entry box 240b of FIG. 2. The search query entry 320 includes the text "Olympics" that matches Olympics node 406a verbatim. Such a verbatim match can accelerate an association between the user interaction and the node in building of the sketch for that node. The search query entry 330 includes the text "Sochi 2014" that may match Olympics node 406a and winter node 408b. Such looser associations may not be made between the user interaction and the nodes in building of the sketches for these two nodes. However, if a correlation between "Sochi 2014" and the two nodes exceeds a predetermined threshold, the looser associations may be made. The correlation can increase if the data logs reveal that users searching "Sochi 2014" also searched "Olympics" and "Winter Olympics", or viewed content associated with the Olympics node 406a and the winter node 408b, for example.

The user device 124 communicates a user query to the search engine server 106. For example, a query entered into a query entry box, such as the query entry box 240b, can be communicated to the server 106. The search engine server 106 locates matching information using any suitable protocol or algorithm and returns information to the user device 124. The information returned may be logged in data logs (such as the logs 516), and such logs may be communicated to the sketch server 118 for processing. The search engine server 106 may be designed to help users find information located on the Internet or an intranet. In an example, the search engine server 106 may also provide to the user device 124 over the network 120 an electronic property, such as a web page, with content, including search results, information matching the context of a user inquiry, links to other network destinations, or information and files of information of interest to a user operating the user device 124, as well as a stream or web page of content items and advertisement items selected for display to the user. The aforementioned information provided by the search engine server 106 may be logged in data logs (such as the logs 516), and such logs may be communicated to the sketch server 118 for processing. These logs can be input for the building of sketches.

The search engine server 106 may enable a device, such as the advertiser device 122, the user device 124, or any other client device, to search for files of interest using a search query. Typically, the search engine server 106 may be accessed by a client device via servers or directly over the network 120. The search engine server 106 may include a crawler component, an indexer component, an index storage component, a search component, a ranking component, a cache, a profile storage component, a logon component, a profile builder, and application program interfaces (APIs). The search engine server 106 may be deployed in a distributed manner, such as via a set of distributed servers, for example. Components may be duplicated within a network, such as for redundancy or better access.

The ad server 108 operates to serve advertisements to user devices, such as the user device 124. Advertisements include data defining advertisement information that may be of interest to a user of a user device. An advertisement may include text data, graphic data, image data, video data, or audio data. An advertisement may further include data defining links to other network resources providing such data. The other locations may be other locations on the internet, other locations on an intranet operated by the advertiser, or any access. The aforementioned targeting data may be logged in data logs (such as the logs 516), and such logs may be communicated to the sketch server 118 for processing. The aforementioned ads provided by the ad server 108 may be logged in data logs (such as the logs 516), and such logs may be communicated to the sketch server 118 for processing. These logs can be input for the building of sketches.

For online information providers, advertisements may be displayed on electronic properties resulting from a user-defined search based, at least in part, upon search terms. Advertising may be beneficial to users, advertisers or web portals if displayed advertisements are relevant to interests of users. Thus, a variety of techniques have been developed to infer user interest, user intent or to subsequently target relevant advertising to users. The aforementioned user interest, user intent, and targeting data may be may be logged in data logs (such as the logs 516), and such logs may be communicated to the sketch server 118 for processing. These logs can be input for the building of sketches.

One approach to presenting targeted advertisements includes employing demographic characteristics (such as age, income, sex, occupation, etc.) for predicting user behavior, such as by group. Advertisements may be presented to users in a targeted audience based, at least in part, upon predicted user behavior. The aforementioned targeting data, such as demographic data and psychographic data, may be logged in data logs (such as the logs 516), and such logs may be communicated to the sketch server 118 for processing. These logs can be input for the building of sketches.

Another approach includes profile-type ad targeting. In this approach, user profiles specific to a user may be generated to model user behavior, for example, by tracking a user's path through a website or network of sites, and compiling a profile based, at least in part, on pages or advertisements ultimately delivered. A correlation may be identified, such as for user purchases, for example. An identified correlation may be used to target potential purchasers by targeting content or advertisements to particular users. The aforementioned profile-type targeting data may be logged in data logs (such as the logs 516), and such logs may be communicated to the sketch server 118 for processing. These logs can be input for the building of sketches.

Yet another approach includes targeting based on content of an electronic property requested by a user. Advertisements may be placed on an electronic property or in association with other content that is related to the subject of the advertisements. The relationship between the content and the advertisement may be determined in any suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be logged in data logs (such as the logs 516), and such logs may be communicated to the sketch server 118 for processing. These logs can be input for the building of sketches.

The ad server 108 includes logic and data operative to format the advertisement data for communication to the user device. The ad server 108 is in data communication with the ad database 110. The ad database 110 stores information, including data defining advertisements, to be served to user devices. This advertisement data may be stored in the ad database 110 by another data processing device or by an advertiser. The advertising data may include data defining advertisement creatives and bid amounts for respective advertisements. The aforementioned ad formatting and pricing data may be logged in data logs (such as the logs 516), and such logs may be communicated to the sketch server 118 for processing. These logs can be input for the building of sketches.

The advertising data may be formatted to an advertising item that may be included in a stream of content items and advertising items provided to a user device. The formatted advertising items can be specified by appearance, size, shape, text formatting, graphics formatting and included information, which may be standardized to provide a consistent look for advertising items in the stream. The aforementioned advertising data may be logged in data logs (such as the logs 516), and such logs may be communicated to the sketch server 118 for processing. These logs can be input for the building of sketches.

Further, the ad server 108 is in data communication with the network 120. The ad server 108 communicates ad data and other information to devices over the network 120. This information may include advertisement data communicated to a user device. This information may also include advertisement data and other information communicated with an advertiser device, such as the advertiser device 122. An advertiser operating an advertiser device may access the ad server 108 over the network to access information, including advertisement data. This access may include developing advertisement creatives, editing advertisement data, deleting advertisement data, setting and adjusting bid amounts and other activities. The ad server 108 then provides the ad items to other network devices, such as the taxonomy server 116 for classification of the ad items. When provided to the taxonomy server 116, the ad information as well as any other type of content information may contribute to or lead to modifications of a content taxonomy stored within the taxonomy server. The aforementioned communicated information may be logged in data logs (such as the logs 516), and such logs may be communicated to the sketch server 118 for processing. These logs can be input for the building of sketches.

The ad server 108 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 110 for subsequent communication in advertisements to a user device. As described herein, recursive unique user metrics for different ad and/or content categories may also be viewed in real time using the advertiser front end. The recursive unique user metrics may compliment advertising data in reports.

The ad server 108 may be a computer system, multiple servers, or any other computing device known in the art. Alternatively, the ad server 108 may be a computer program, instructions, and/or software code stored on a computer-readable storage medium that runs on a processor of a single server, a plurality of servers, or any other type of computing device known in the art.

Figure 4:
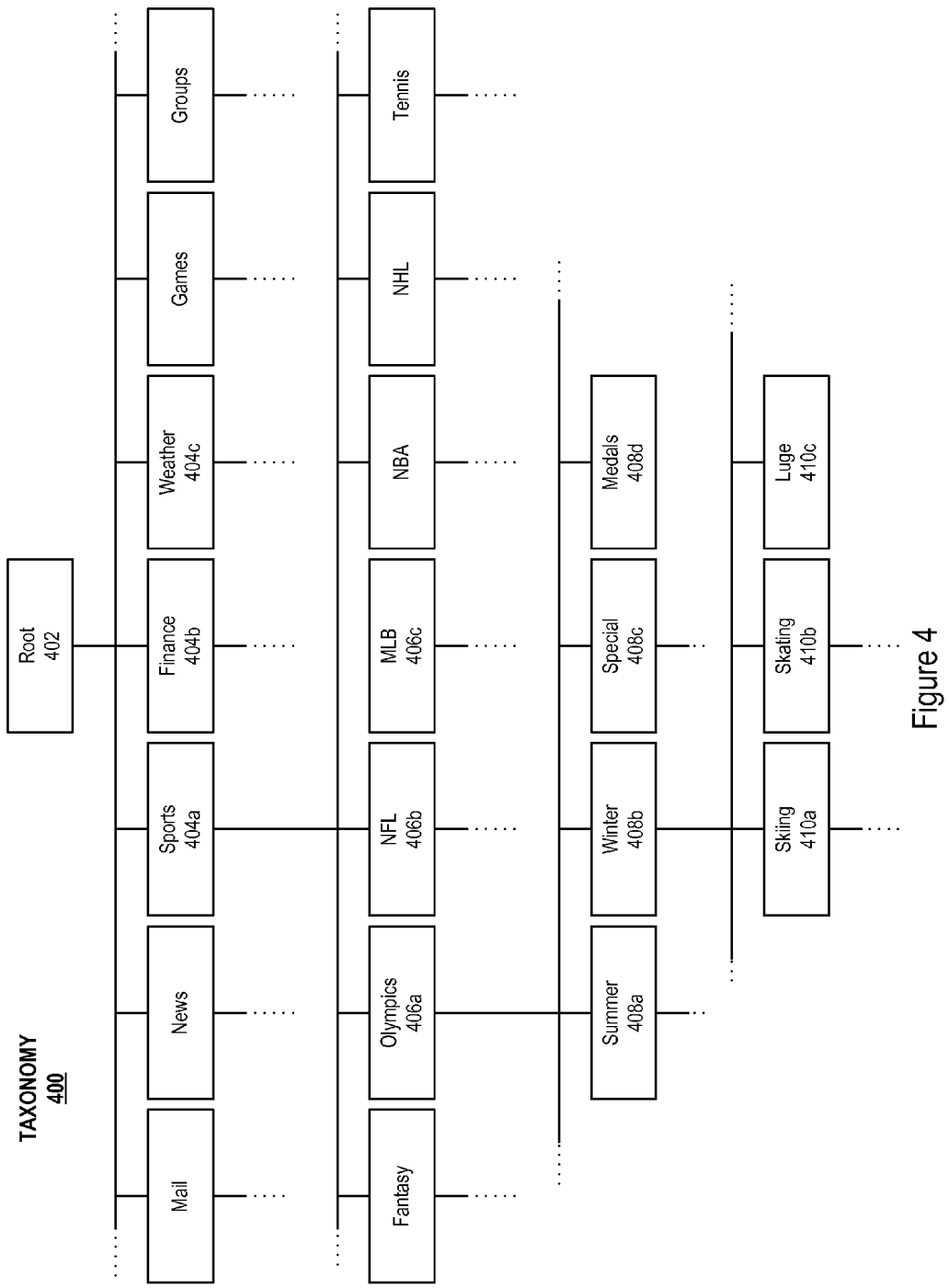
FIG. 4 illustrates an example online content taxonomy that may be associated with user interactions with the example screens in FIG. 2 and example graphical elements in FIG. 3.

The content server 112 and the taxonomy server 116 may access information about content items either from the content database 114 or from another location accessible over the network 120. The content server 112 and the taxonomy server 116 communicate data defining content items and other information to devices over the network 120. For example, the taxonomy server 116 can communicate hierarchical taxonomies representing categories of the content items. These taxonomies may also represent categories of ad items. FIG. 4 illustrates an example online content taxonomy that can be communicated by the taxonomy server to other devices over the network 120. For example, taxonomies, such as a taxonomy 518 of FIG. 5, may be communicated to the sketch server 118 for processing. The taxonomies can be input for the building of sketches.

The information about content items may also include content data and other information communicated by a content provider operating a content provider device. A content provider operating a content provider device may access the content server 112 or the taxonomy server 116 over the network 120 to access information, including content data. This access may be for developing content items, editing content items, deleting content items, setting and adjusting bid amounts and other activities. A content provider operating a content provider device may also access the sketch server 118 over the network 120 to access information, such as recursive unique user metrics. Such metrics may help focus developing content items, editing content items, deleting content items, setting and adjusting bid amounts, and other activities.

The content server 112 or the taxonomy server 116 may provide a content provider front end to simplify the process of accessing the content data of a content provider or a content taxonomy of a provider. The content provider front end may be a program, application or software routine that forms a user interface. In a particular example, the content provider front end is accessible as a website with electronic properties that an accessing content provider may view on the content provider device. The content provider may view and edit content data using the content provider front end. After editing the content data, such as at the content server 112 or another source of content, the content data may then be saved to the content database 114 or the taxonomy server 116 for subsequent communication to a user device. In an example, the taxonomy server 116 is dedicated to using such data to modify corresponding content taxonomies.

Also, recursive unique user metrics for different ad and/or content categories may be viewed in real time using the content provider front end. The content provider front end may be a client-side application, such as a client-side application 503 running on the client device 501. The script and/or applet 505 may be a part of this front end and may render access points for retrieval of the recursive unique user metrics, and the script and/or applet may manage the retrieval of the recursive unique user metrics and other metrics. In an example, this front end may include a graphical display of fields for selecting a category or a combination of categories. Then this front end, via the script and/or applet 505, can request the recursive unique user metrics for the category or the combination of categories. The metrics can then be displayed, such as displayed according to the script and/or applet 505.

The content server 112 or the taxonomy server 116 includes logic and data operative to format content data, taxonomy data, and other information for communication to the user device. The content server 112 or the taxonomy server 116 can also provide the content items or taxonomies to other network devices, respectively. The content server 112 can provide content items or links to such items to the taxonomy server 116 to associate with nodes in taxonomies and/or to include in the rendering of taxonomies. For example, content items and links may be matched to nodes of a taxonomy. The matching may be complex and may be based on historical information related to the nodes. Techniques for matching content items and links to nodes of a taxonomy are numerous and beyond the scope of this application.

The content data may be formatted to a content item that may be included in a stream of content items and advertisement items provided to a user device. The formatted content items can be specified by appearance, size, shape, text formatting, graphics formatting and included information, which may be standardized to provide a consistent look for content items in the stream. The formatting of content data may be logged in data logs (such as the logs 516), and such logs may be communicated to the sketch server 118 for processing. These logs can be input for the building of sketches.

In an example, the content items may have an associated bid amount that may be used for ranking or positioning the content items in a stream of items presented to a user device. In other examples, the content items do not include a bid amount, or the bid amount is not used for ranking the content items. Such content items may be considered non-revenue generating items. The bid amounts and other related information may be logged in data logs (such as the logs 516), and such logs may be communicated to the sketch server 118 for processing. These logs can be input for the building of sketches.

The content server 112 and/or the taxonomy server 116 can include logic and data operative to format content data, taxonomies, and other information for communication to a device coupled on the network 120.

The aforementioned servers and databases may be implemented through any suitable computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like.

The aforementioned servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include, without limitation, Flicker, Twitter, Facebook, LinkedIn, or a personal user site (such as a blog, vlog, online dating site, etc.). An online server system may also host a variety of other sites, including, but not limited to business sites, educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 120 may include any data communication network or combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, such as may employ differing architectures or may be compliant or compatible with differing protocols, may interoperate within a larger network, such as the network 120.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

The advertiser device 122 includes any data processing device that may access the information system 100 over the network 120. The advertiser device 122 is operative to interact over the network 120 with any of the servers or databases described herein. The advertiser device 122 may implement a client-side application for viewing electronic properties and submitting user requests. The advertiser device 122 may communicate data to the information system 100, including data defining electronic properties and other information. The advertiser device 122 may receive communications from the information system 100, including data defining electronic properties and advertising creatives. The aforementioned interactions and information may be logged in data logs (such as the logs 516), and such logs may be communicated to the sketch server 118 for processing. These logs can be input for the building of sketches.

In an example, content providers may access the information system 100 with content provider devices that are generally analogous to the advertiser devices in structure and function. The content provider devices provide access to content data in the content database 114, for example.

The user device 124 includes any data processing device that may access the information system 100 over the network 120. The user device 124 is operative to interact over the network 120 with the search engine server 106, the ad server 108, the content server 112, the taxonomy server 116, and the sketch server 118. The user device 124 may implement a client-side application for viewing electronic content and submitting user requests. A user operating the user device 124 may enter a search request and communicate the search request to the information system 100. The search request is processed by the search engine and search results are returned to the user device 124. The aforementioned interactions and information may be logged in data logs (such as the logs 516), and such logs may be communicated to the sketch server 118 for processing. These logs can be input for the building of sketches.

In other examples, a user of the user device 124 may request data, such as a page of information from the online information system 100. The data instead may be provided in another environment, such as a native mobile application, TV application, or an audio application. The online information system 100 may provide the data or re-direct the browser to another source of the data. In addition, the ad server may select advertisements from the ad database 110 and include data defining the advertisements in the provided data to the user device 124. The aforementioned interactions and information may be logged in data logs (such as the logs 516), and such logs may be communicated to the sketch server 118 for processing. These logs can be input for the building of sketches.

The advertiser device 122 and the user device 124 operate as a client device when accessing information on the information system 100. A client device, such as the advertiser device 122 and the user device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, both laptop computer 126 and smartphone 128, which can be client devices, may be operated as either an advertiser device or a user device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example.

A client device, such as the advertiser device 122 and the user device 124, may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or games. The foregoing is provided to illustrate that claimed subject matter is intended to include a wide range of possible features or capabilities. At least some of the features, capabilities, and interactions with the aforementioned may be logged in data logs (such as the logs 516), and such logs may be communicated to the sketch server 118 for processing. These logs can be input for the building of sketches.

Also, the disclosed methods and systems may be implemented at least partially in a cloud-computing environment, at least partially in a server, at least partially in a client device, or in a combination thereof.

FIG. 2 illustrates displayed ad items and content items of example screens rendered by client-side applications. The content items and ad items displayed may be provided by the search engine server 106, the ad server 108, the content server 112, or the taxonomy server 116 of FIG. 1. For example, menus of content may be provided dynamically by the taxonomy server 116, according to a taxonomy, such as a taxonomy 400 of FIG. 4, stored in the taxonomy server. In such an example, menu items may be strictly associated with a respective taxonomy (such as items of menu 300 of FIG. 3 match verbatim some nodes of the taxonomy 400) or loosely associated with the respective taxonomy (such as items of menu 310 of FIG. 3 match some nodes of the taxonomy 400 by correlations, but not verbatim). Menus of content may be opened by rolling over or clicking on menu anchors, such as the menu anchor labeled "sports" 240*a*. A users interactions with the menu anchor 240*a*, the query entry box 240*b*, or any other tracked aspect of the screens can be tracked and logged in data logs (such as the logs 516), and such logs may be communicated to the sketch server 118 for processing. These logs can be input for the building of sketches.

In FIG. 2, a display ad 202 is illustrated as displayed on a variety of displays including a mobile web device display 204, a mobile application display 206 and a personal computer display 208. The mobile web device display 204 may be shown on the display screen of a mobile handheld device, such as a smartphone. The mobile application display 206 may be shown on the display screen of a portable device, such as a tablet computer. The personal computer display 208 may be displayed on the display screen of a personal computer (PC).

The display ad 202 is shown in FIG. 2 formatted for display on a user device but not as part of a stream to illustrate an example of the contents of such a display ad. The display ad 202 includes text 212, graphic images 214 and a defined boundary 216. The display ad 202 can be developed by an advertiser for placement on an electronic property, such as a web page, sent to a user device operated by a user. The display ad 202 may be placed in a wide variety of locations on the electronic property. The defined boundary 216 and the shape of the display ad can be matched to a space available on an electronic property. If the space available has the wrong shape or size, the display ad 202 may not be useable. Such reformatting may be logged in data logs (such as the logs 516), and such logs may be communicated to the sketch server 118 for processing. These logs can be input for the building of sketches.

In these examples, the display ad is shown as a part of streams 224*a*, 224*b*, and 224*c*. The streams 224*a*, 224*b*, and 224*c* include a sequence of items displayed, one item after another, for example, down an electronic property viewed on the mobile web device display 204, the mobile application display 206 and the personal computer display 208. The streams 224*a*, 224*b*, and 224*c* may include any type of items. In the illustrated example, the streams 224*a*, 224*b*, and 224*c* include content items and advertising items. For example, stream 224*a* includes content items 226*a* and 228*a* along with advertising item 222*a*; stream 224*b* includes content items 226*b*, 228*b*, 230*b*, 232*b*, 234*b* and advertising item 222*b*; and stream 224*c* includes content items 226*c*, 228*c*, 230*c*, 232*c* and 234*c* and advertising item 222*c*. With respect to FIG. 2, the content items can be items published by non-advertisers. However, these content items may include advertising components. Each of the streams 224*a*, 224*b*, and 224*c* may include any number of content items and advertising items.

In an example, the streams 224*a*, 224*b*, and 224*c* may be arranged to appear to the user to be an endless sequence of items, so that as a user, of a user device on which one of the streams 224*a*, 224*b*, or 224*c* is displayed, scrolls the display, a seemingly endless sequence of items appears in the displayed stream. The scrolling can occur via the scroll bars, for example, or by other known manipulations, such as a user dragging his or her finger downward or upward over a touch screen displaying the streams 224*a*, 224*b*, or 224*c*. To enhance the apparent endless sequence of items so that the items display quicker from manipulations by the user, the items can be cached by a local cache and/or a remote cache associated with the client-side application or the page view.

The content items positioned in any of streams 224*a*, 224*b*, and 224*c* may include news items, business-related items, sports-related items, etc. Further, in addition to textual or graphical content, the content items of any stream may include other data as well, such as audio and video data or applications. Each content item may include text, graphics, other data, and a link to additional information. Clicking or otherwise selecting the link re-directs the browser on the user's device to an electronic property referred to as a landing page that contains the additional information. The clicking or otherwise selecting of the link, the re-direction to the landing page, the landing page, and the additional information, for example, can each be tracked, and then the data associated with the tracking can be logged in data logs (such as the logs 516), and such logs may be communicated to the sketch server 118 for processing. These logs can be input for the building of sketches. The sketches that result can be used for various tasks including analytics.

Stream ads like the advertising items 222*a*, 222*b*, and 222*c* may be inserted into the stream of content, supplementing the sequence of related items, providing a more seamless experience for end users. Similar to content items, the advertising items may include textual or graphical content as well as other data, such as audio and video data or applications. Each advertising item 222a, 222b, and 222c may include text, graphics, other data, and a link to additional information. Clicking or otherwise selecting the link re-directs the browser on the user's device to an electronic property referred to as a landing page. The clicking or otherwise selecting of the link, the re-direction to the landing page, the landing page, and the additional information, for example, can each be tracked, and then the data associated with the tracking can be logged in data logs (such as the logs 516), and such logs may be communicated to the sketch server 118 for processing. These logs can be input for the building of sketches.

While the example streams 224a, 224b, and 224c are shown with a single visible advertising item 222a, 222b, and 222c, respectively, any number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms.

The various features described with respect to FIGS. 1-4 and interactions associated with such features can be tracked and logged in data logs (such as the logs 516), and such logs may be communicated to the sketch server 118 for processing. These logs can be input for the building of sketches. For the most part these logs include user interaction data that can be associated with taxonomies through the building of sketches. Therefore, in order to perform such associations, at least one taxonomy (such as the taxonomy 518 or taxonomy 400) is inputted as well.

FIG. 4 illustrates the taxonomy 400 that may be associated with user interactions with the example screens in FIG. 2 and example graphical elements in FIG. 3. The taxonomy 400 includes a root node 402, which is an ancestor of all nodes of the taxonomy 400. The taxonomy includes first level nodes (such as sports node 404a, finance node 404b, and weather node 404c) that are descendants of the root node. The taxonomy 400 also includes second level nodes (such as Olympics node 406a, NFL node 406b, and MLB node 406c) that are descendants of the root node and the sports node 404a. The taxonomy 400 also includes third level nodes (such as summer node 408a, winter node 408b, special node 408c, and medals node 408d) that are descendants of the root node, the sports node 404a, and the Olympics node 406a. The taxonomy 400 also includes fourth level nodes (such as skiing node 410a, skating node 410b, and luge node 410c) that are descendants of the root node, the sports node 404a, the Olympics node 406a, and the winter node 408b.

Every node illustrated in FIG. 4 has descendant nodes, except for the illustrated terminal nodes (such as medals node 408d and luge node 410c). A node that is not connected to a line extending downward from the node illustrates a terminal node in FIG. 4. A line with dots extending from a node represents a continuation of the taxonomy that does not fit within the drawing.

Every node illustrated in FIG. 4 has at least one ancestor node, except for the root node 402. For the purpose of this disclosure, ancestor and descendant nodes are nodes that link vertically with a given node. For example, for the winter node 408b, its ancestor nodes include the Olympics node 406a, the sports node 404a, and the root node 402. For winter node 408b, its ancestor nodes do not include the summer node 408a, NFL node 406b, or the finance node 404b, for example. For the winter node 408b, its decedent nodes include the skiing node 410a, the skating node 410b, and the luge node 410c. For the winter node 408b, its decedent nodes do not include the summer node 408a, the special node 408c, or their respective decedent nodes, for example. Also, for the winter node 408b, its decedent nodes do not include the medal node 408d.

Figure 5:
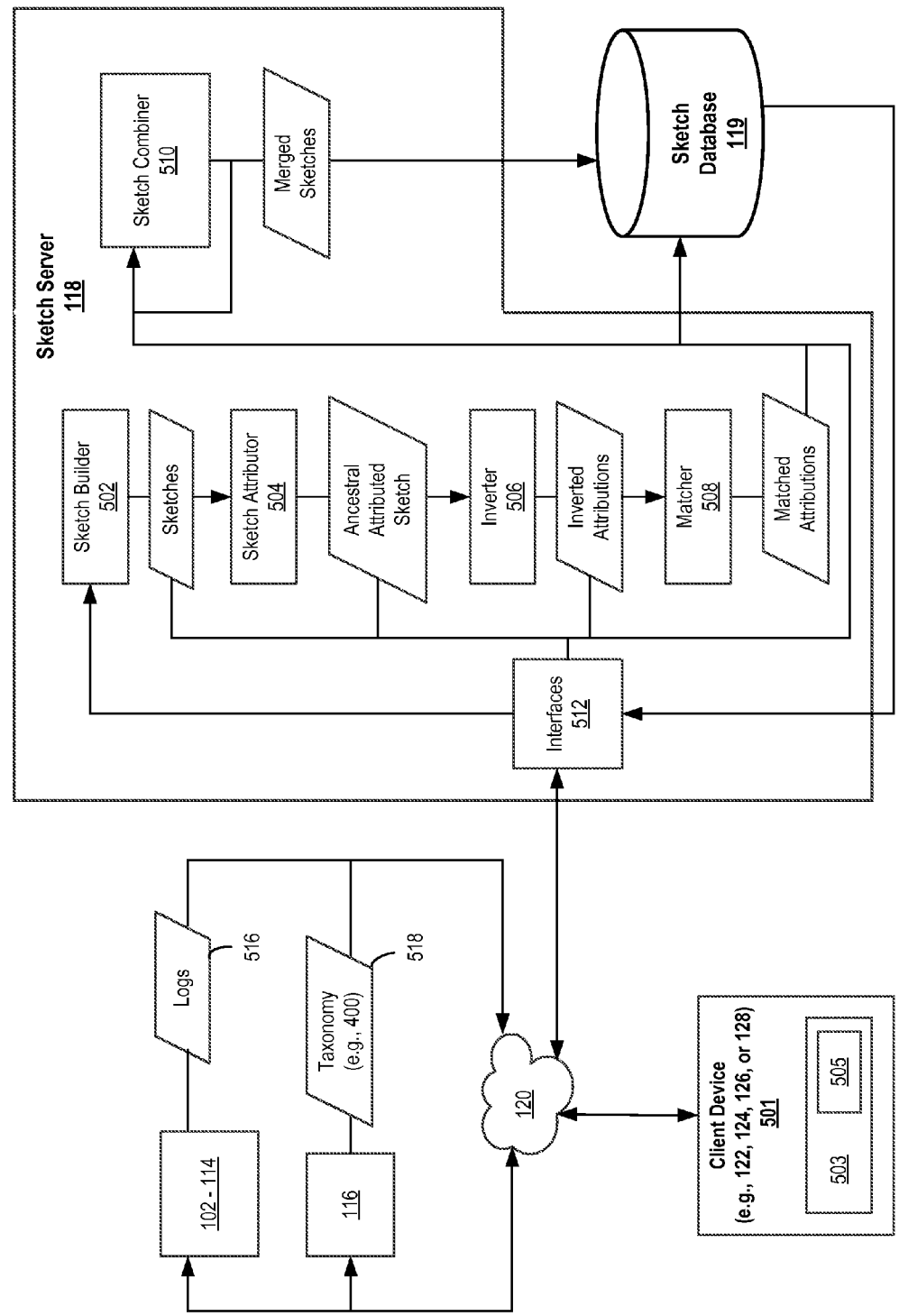
FIG. 5 illustrates a block diagram of the example information system of FIG. 1 (information system 100 of FIG. 1) interacting with an example system that can provide recursive unique user metrics in real time (sketch server 118 of FIG. 1).

FIG. 5 illustrates a block diagram of the example information system of FIG. 1 (information system 100) interacting with an example system that can provide recursive unique user metrics in real time (sketch server 118). For example, FIG. 3 illustrates the sketch server 118 that enables providing recursive unique user metrics in real time using merged sketches. In an example, the sketch server generates merged sketches that it stores in the sketch database 119. A merged sketch is a combination of a given sketch for a given node and at least one sketch of a decedent node of the given node.

A sketch can be a category represented by a data structure or a complex value, such as a hash. A sketch can include limits, such as limit cones, and co-limits, such as co-limit cones. A model of the sketch in a category C can be a functor M: D→C, which takes each specified cone to a limit cone in C and each specified co-cone to a co-limit co-cone in C. See http://en.wikipedia.org/wiki/Sketch_(mathematics). Morphisms of such models can be natural transformations. See Id. Sketches can specify structures on the objects of a category. See Id. Sketches can form a category-theoretic analog to a logical concept of a theory and its models. See Id. Sketches can allow multisorted models and models in any category. See Id. An extensive definition or list of features of a sketch is beyond the scope of this application.

As illustrated, aspects that are part of a system for generating merged sketches are hosted in the sketch server 118. The parts of the system, illustrated in FIG. 5, that can provide recursive unique user metrics in real time include interfaces 512 and the sketch database 119. However, any of the depicted aspects of the system, for generating merged sketches and/or providing recursive unique user metrics in real time, may be hosted on a device external to the sketch server 118 and the sketch database 119. For example, the client device 501 (such as the client device 122, 124, 126, or 128) can host a client-side application 503 that can host or at least be associated with the script and/or applet 505 that can manage the selection, retrieval, and/or presentation of recursive unique user metrics in real time. In an example, the presentation can be rendered through the client-side application 503.

FIG. 5 depicts the sketch server 118 hosting a sketch builder 502, a sketch attributor 504, an inverter 506, a matcher 508, a sketch combiner 510, and the interfaces 512. As depicted, the sketch builder 502 may be communicatively coupled to the sketch attributor 504. The sketch attributor 504 may be communicatively coupled to the inverter 506. The inverter 506 may be communicatively coupled to the matcher 508. The matcher 508 may be communicatively coupled to the sketch combiner 510. The sketch combiner 510 may be communicatively coupled to the sketch database 119. The sketch database may be communicatively coupled to the interfaces 512. The interfaces 512 may be communicatively coupled to the sketch database 119, the sketch combiner 510, the sketch builder 502 and the network 120. As depicted in FIGS. 1 and 5, the network 120 communicatively couples the sketch server with the other devices of FIGS. 1 and 5.

Besides the channels between parts of the system, FIG. 5 also depicts data flow between the parts. For example, the devices 102-114 of FIG. 1 can communicate the logs 516 to the interfaces 512, via the network 120. The taxonomy server 116 of FIG. 1 can also communicate the taxonomy 518 (such as the taxonomy 400) to the interfaces 512, via the network 120. The interfaces can communicate the logs 516 and the taxonomy 518 to the sketch builder 502. The sketch builder 502 can use the logs 516 and the taxonomy 518 to derive sketches. The sketch builder 502 can also communicate the sketches to the sketch attributor 504. The sketch attributor 504 can attribute the sketches to their ancestors according to the sketches. The sketch attributor 504 can also output data logs including a log of the ancestor attributed sketches. This attribution log can be communicated by the sketch attributor 504 to the inverter 506. The inverter can invert the attributions of the sketches, such as by inverting the data within the attribution log. The result of the inversion can be data logs including a log of the inverted attributions. This inverted log can be communicated by the inverter 506 to the matcher 508. The matcher 508, using the inverted log, can match descendant sketches of a given sketch. The result of the matching can be data logs including a log of the matched decedent sketches per given sketch. This matched log can be communicated by the matcher 508 to the sketch combiner 510. The sketch combiner 510, according to the matched log, can merge decedent sketches with their shared ancestor sketch, per ancestor sketch. An ancestor sketch is a sketch for an ancestor node. A descendant sketch is a sketch for a descendant node. The merged sketches can be communicated from the sketch combiner 510 to the sketch database 119.

Also, the aforementioned taxonomy, sketches, logs, and merged sketches can be communicated to the sketch database 119 and the sketch combiner 510. In an example, the sketch combiner can use the taxonomy, the sketches, and/or the logs to generate the merged sketches. Also, the sketch database 119 can store an archive of the taxonomy, the sketches, the logs, and merged sketches at different instances in time. At least part of this archived information can be used to optimize the merging of sketches. Also, because merged sketches can be archived, recursive unique user metrics can be retrieved for a node for different time periods, such as different time spans and different hours of a day, days of a week, weeks of a month, months of a year, and different years.

Upon requested recursive unique user metrics received by the interfaces 512, from the client device 501, such as from the client-side application 503, via the network 120, sketch database 119 can communicate a merged sketch to the interfaces 512 or the client device, via the interfaces 512 and the network 120. Depending on the example, the recursive unique user metric for a node can be determined at the sketch database 119 prior to being communicated to the client device 501, at the interfaces 512 prior to being communicated to the client device, or at the client device. In an example where the recursive unique user metric is determined from a sketch at the client device, the determination can be made by the script and/or applet 505.

Figure 6:
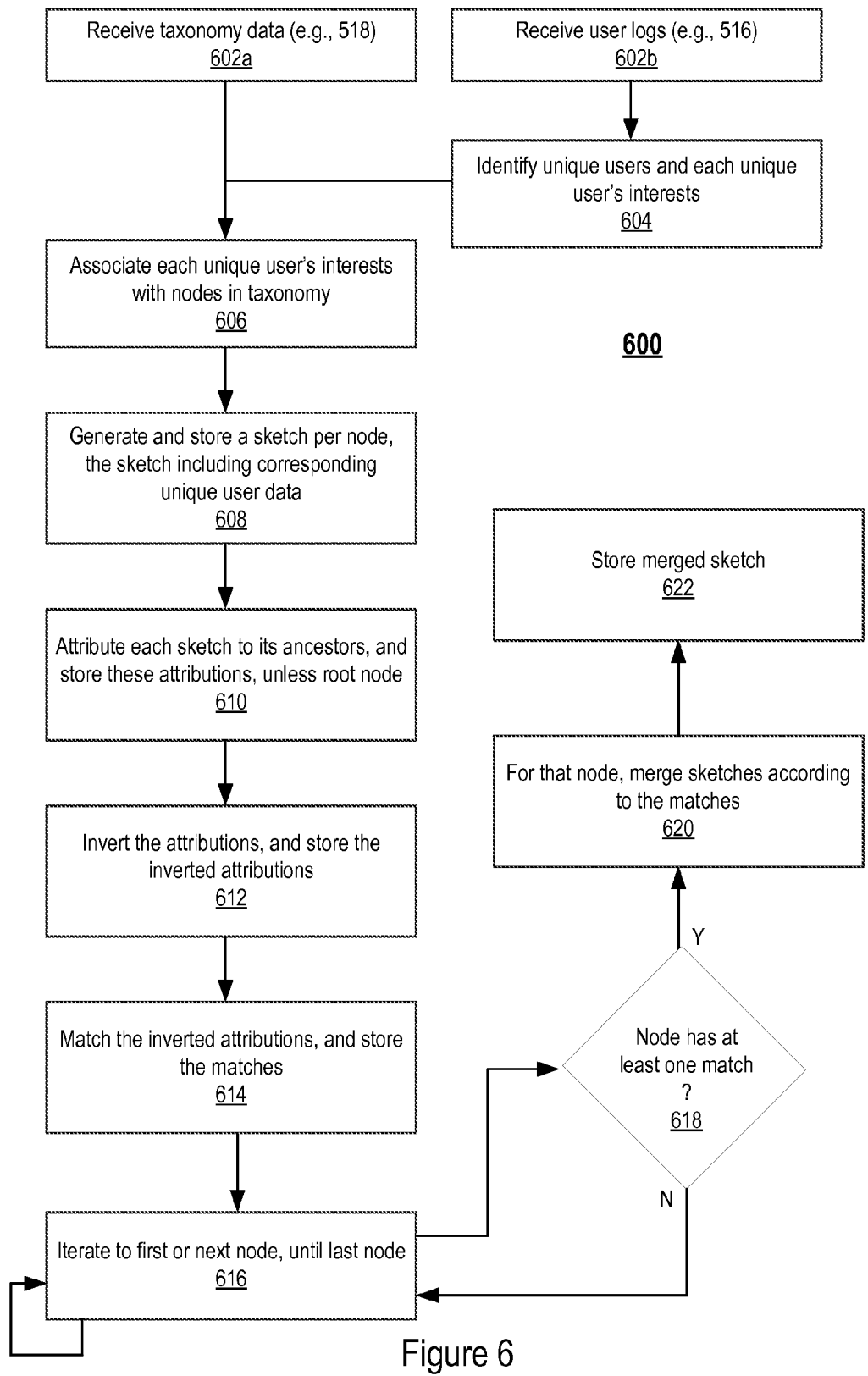
FIGS. 6 and 7 illustrate example operations performed by example systems that can provide recursive unique user metrics in real time (such as the sketch server 118).

FIG. 6 illustrates example operations 600 performed by example systems that can generate and store merged sketches (such as the systems within the sketch server 118). The operations 600 can include receiving taxonomy data (such as the taxonomy 518), at 602a. Also, the operations 600 can include receiving user logs (such as the logs 516), at 602b. The receiving operations at 602a and 602b can be implemented by interfaces of the systems that are communicatively coupled to a sketch builder (such as the sketch builder 502).

At 604, the operations 600 can include identifying unique users and each unique user's interests, from the user logs. At 606, the operations 600 can include associating each unique user's interests with nodes in a taxonomy identified in the taxonomy data. The associating of each unique user's interests with nodes in the taxonomy can be repeated for every unique user identified in the user logs, at 604. At 608, the operations 600 can include generating and storing a sketch per given node. Each sketch can include unique user metrics associated with the given node. A sketch builder (such as the sketch builder 502) can perform operations at 604-608.

At 610, the operations 600 can include attributing each sketch to its ancestors, and storing these attributions. Operations at 610 can be performed by a sketch attributor (such as the sketch attributor 504). These attributions can occur for every node except for the root node. In an example, these attributions can be logged in a log file. Log 1 illustrates attributing a sketch for the skiing node 410a to its ancestor sketches.

Log 1:

Sketch.Skiing → Sketch.Winter\Sketch.Olympics\Sketch.Sports\Sketch.Root
Sketch.Skiing → Sketch.Olympics\Sketch.Sports\Sketch.Root
Sketch.Skiing → Sketch.Sports\Sketch.Root
Sketch.Skiing → Sketch.Root At 612, the operations 600 can include inverting the attributions of each sketch to its ancestors, and storing these inverted attributions. An inverter (such as the inverter 506) can do the inversion. These inverted attributions can occur for every node except for the root node. In an example, these inverted attributions can be logged in a log file. Log 2 illustrates an example inversion of Log 1.

Log 2:

| Sketch.Winter\Sketch.Olympics\Sketch.Sports\Sketch.Root | → Sketch.Skiing |
| Sketch.Olympics\Sketch.Sports\Sketch.Root | → Sketch.Skiing |
| Sketch.Sports\Sketch.Root | → Sketch.Skiing |
| Sketch.Root | → Sketch.Skiing |

At 614, the operations 600 can include matching the inverted attributions across ancestor sketches (or each sketch of the ancestor nodes), and storing these matches. A matcher (such as the matcher 508) can perform the matching. These matches can occur for every node except for terminal nodes. In an example, these matches can be logged in a log file. Log 3 illustrates an example matching of Log 2 with other inverted logs for decedents of the ancestor sketch for the winter node 408*b*.

| Log 3: | |
|---|---|
| Match: | |
| Sketch.Winter\Sketch.Olympics\Sketch.Sports\Sketch.Root | → Sketch.Skiing |
| Sketch.Olympics\Sketch.Sports\Sketch.Root | → Sketch.Skiing |
| Sketch.Sports\Sketch.Root | → Sketch.Skiing |
| Sketch.Root | → Sketch.Skiing |
| With: | |
| SketchWinter\Sketch.Olympics\Sketch.Sports\Sketch.Root | →Sketch.Skating |
| Sketch.Olympics\Sketch.Sports\Sketch.Root | → Sketch.Skating |
| Sketch.Sports\Sketch.Root | → Sketch.Skating |
| Sketch.Root | → Sketch.Skating |
| Match between Sketch.Skiing and Sketch.Skating for: | |
| Sketch.Winter | |
| Sketch.Olympics | |
| Sketch.Sports | |
| Sketch.Root | |

As can be imagined the log file of the matching data can be millions of lines for a taxonomy such as the taxonomy 400 of FIG. 4. However, because the generation of merged sketches occurs at a server computer, there are practically no limitations with time or resources to produce such a log file and the generate merged sketches according to such a lengthy file.

At 616, the operations 600 can include iterating through the matches from operations at 614, for every sketch. At 618, it is determined whether a given sketch has matching decedents. In other words, it is determined whether a given sketch is a sketch of a terminal node. If the sketch is for a terminal node, then the operations 600 return to the iteration at 616 to iterate to a next sketch to check for matches. Where it is determined that a sketch does have matching decedents, each matching descendant node and their ancestor nodes are merged, per ancestor node, at 620. At 622, the merged sketch is stored, such as in a database for retrieval. A sketch combiner (such as the sketch combiner 510) can perform the merging and the storing. Log 4 illustrates merging of matching decedent sketches with their shared ancestor sketch for the example matches in Log 3.

| Log 4: |
|---|
| Match between Sketch.Skiing and Sketch.Skating for: |
| Sketch.Winter |
| Sketch.Olympics |
| Sketch.Sports |
| Sketch.Root |
| Therefore: |
| Merge Sketch.Skiing and Sketch.Skating with Sketch.Winter |
| Merge Sketch.Skiing and Sketch.Skating with Sketch.Olympics |
| Merge Sketch.Skiing and Sketch.Skating with Sketch.Sports |
| Merge Sketch.Skiing and Sketch.Skating with Sketch.Root |

Figure 7:
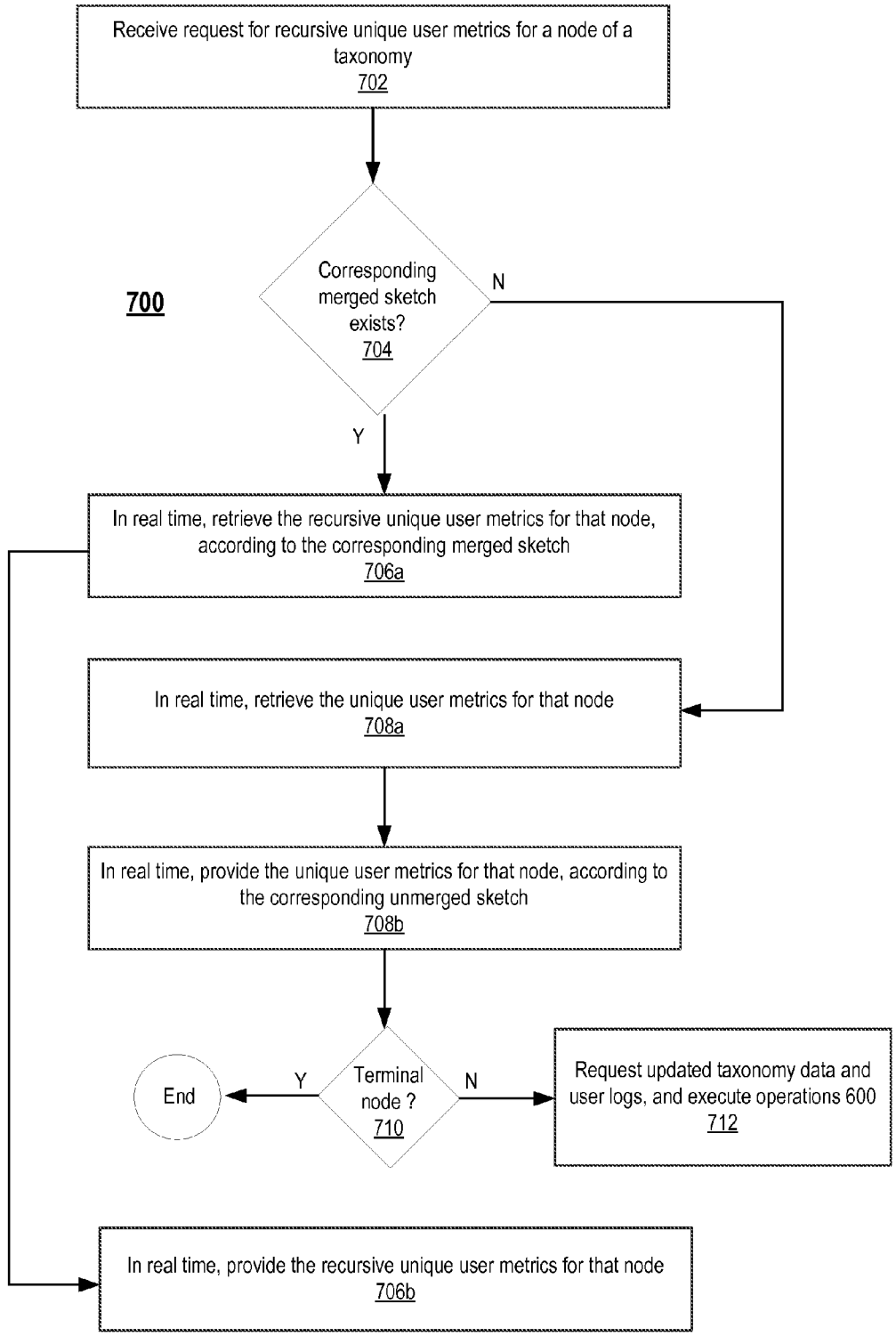

FIG. 7 illustrates example operations 700 performed by example systems that can provide recursive unique user metrics in real time (such as the sketch server 118).

The operations 700 can include receiving a request for recursive unique user metrics for a node of a taxonomy, at 702. At 704, the operations 700 can include determining whether a corresponding merged sketch exists. At 706*a*, the system can retrieve the recursive unique user metrics for the node in real time, according to the corresponding merged sketch, when the sketch exists in storage. Where the corresponding merged sketch does not exist in storage, the system can retrieve unique user metrics for the node in real time at 708*a*. These metrics are not recursive. At 706*b* or 708*b*, the system provides the retrieved recursive unique user metrics or the retrieved unique user metrics to the requester in real time, respectively. In an example, the requester may be a client-side application such as a web browser.

At 710, after not being able to provide the recursive unique user metrics, the system can determine whether the node is a terminal node. If the node is a terminal node, the operations 700 can end. However, if the node is not a terminal node, then the system can request an update to the taxonomy data and/or user logs, at 712. Also, at 712, the system can execute the operations 600, so that the missing merged sketch can be generated.

Figure 8:
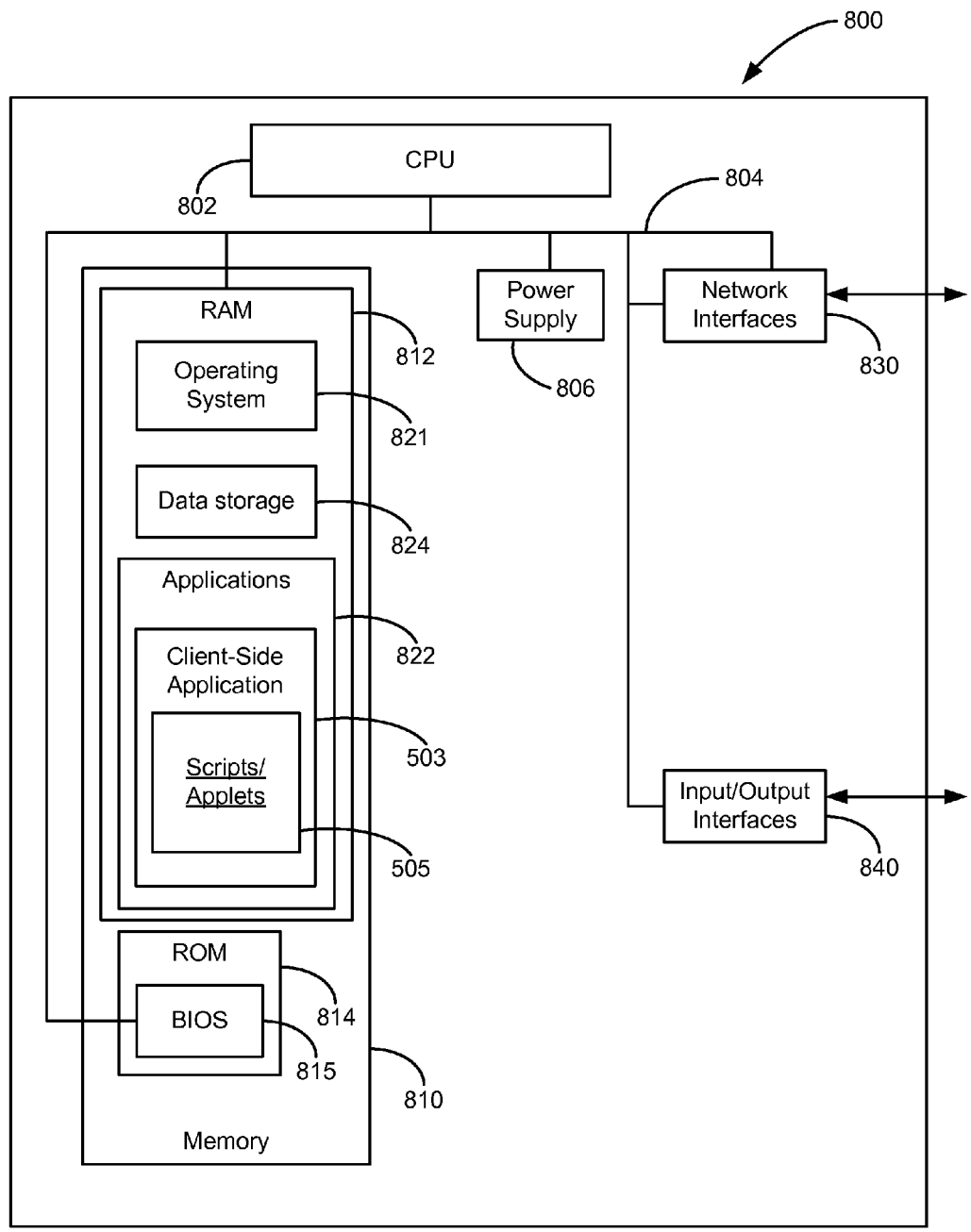
FIGS. 8 and 9 are block diagrams of example electronic devices that can implement aspects of and related to example systems that can provide recursive unique user metrics in real time (such as a client device 501 of FIG. 5 and the sketch server 118).

FIG. 8 is a block diagram of an example of an electronic device 800 that can request recursive unique user metrics for delivery in real time, such as client device 501. The electronic device 800 can include a processor 802, memory 810, a power supply 806, and input/output components, such as network interfaces 830 and input/output interfaces 840, and a communication bus 804 that connects the aforementioned elements of the electronic device. The network interfaces 830 can include a receiver and a transmitter (or a transceiver), and an antenna for wireless communications. The processor 802 can be any type of processing device, such as a central processing unit (CPU). Also, for example, the processor 802 can be central processing logic; central processing logic may include hardware, firmware, software and/or combinations of each to perform functions or actions, and/or to cause a function or action from another component. Also, central processing logic may include a software controlled microprocessor, discrete logic such as an application specific integrated circuit (ASIC), a programmable/ programmed logic device, memory device containing instructions, or the like, or combinational logic embodied in hardware. Also, logic may also be fully embodied as software.

The memory 810, which can include random access memory (RAM) 812 or read-only memory (ROM) 814, can be enabled by memory devices, such as a primary (directly accessible by the CPU) and/or a secondary (indirectly accessible by the CPU) storage device (such as flash memory, magnetic disk, optical disk).

The RAM 812 can store data and instructions defining an operating system 821, data storage 824, and applications 822, including the client-side application 503 and the script and/or applet 505. The applications 822 may include hardware, firmware, software, or any combination thereof. Example content provided by an application, such as the client-side application 503, may include text, images, audio, video, or the like, which may be processed in the form of physical signals, such as electrical signals, for example, or may be stored in memory, as physical states, for example.

The ROM 814 can include basic input/output system (BIOS) 815 of the electronic device 800. The power supply 806 contains power components, and facilitates supply and management of power to the electronic device 800. The input/output components can include any interfaces for facilitating communication between any components of the electronic device 800, components of external devices (such as components of other devices of the information system 100), and end users. For example, such components can include a network card that is an integration of a receiver, a transmitter, and I/O interfaces, such as input/output interfaces 840. A network card, for example, can facilitate wired or wireless communication with other devices of a network. In cases of wireless communication, an antenna can facilitate such communication. The I/O components, such as I/O interfaces 840, can include user interfaces such as monitors, keyboards, touchscreens, microphones, and speakers. Further, some of the I/O components, such as I/O interfaces 840, and the bus 804 can facilitate communication between components of the electronic device 800, and can ease processing performed by the processor 802.

Figure 9:
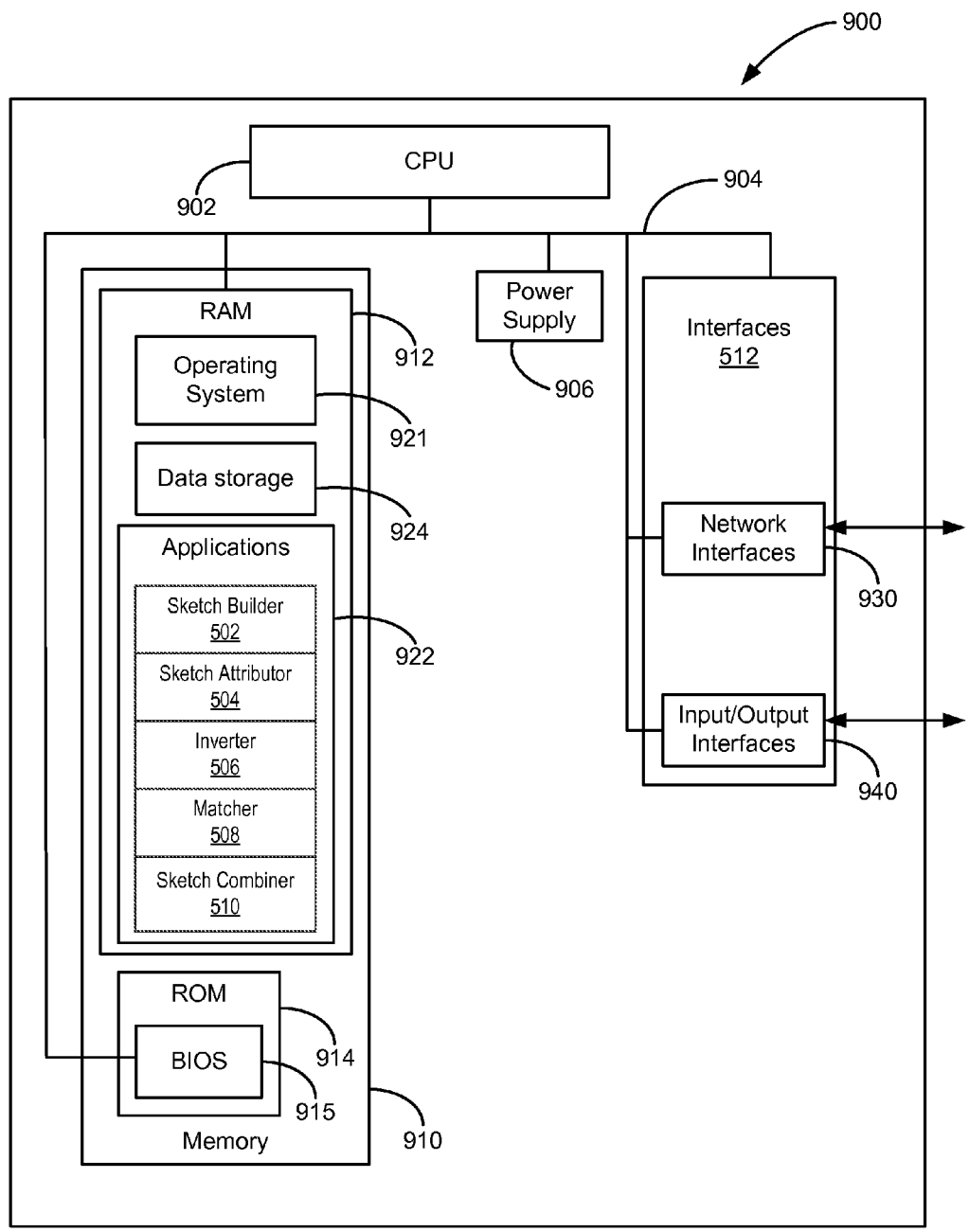

FIG. 9 is a block diagram of an example of an electronic device 900 that can generate merged sketches and can respond to requests for recursive unique user metrics for delivery in real time, such as the sketch server 118. The electronic device 900 can include a processor 902, memory 910, a power supply 906, and input/output components, such as network interfaces 930 and input/output interfaces 940, and a communication bus 904 that connects the aforementioned elements of the electronic device. The network interfaces 930 can include a receiver and a transmitter (or a transceiver), and an antenna for wireless communications. The processor 902 can be any type of processing device, such as a central processing unit (CPU). Also, for example, the processor 902 can be central processing logic.

The memory 910, which can include random access memory (RAM) 912 or read-only memory (ROM) 914, can be enabled by memory devices. The RAM 912 can store data and instructions defining an operating system 921, data storage 924, and applications 922, including the sketch builder 502, the sketch attributor 504, the inverter 506, the matcher 508, and the sketch combiner 510. The applications 922 may include hardware, firmware, software, or any combination thereof. The ROM 914 can include basic input/output system (BIOS) 915 of the electronic device 900.

The power supply 906 contains power components, and facilitates supply and management of power to the electronic device 900. The input/output components can include the interfaces 512 for facilitating communication between any components of the electronic device 900, components of external devices (such as components of other devices of the information system 100), and end users. For example, such components can include a network card that is an integration of a receiver, a transmitter, and I/O interfaces, such as input/output interfaces 940. The I/O components, such as I/O interfaces 940, can include user interfaces such as monitors, keyboards, touchscreens, microphones, and speakers. Further, some of the I/O components, such as I/O interfaces 940, and the bus 904 can facilitate communication between components of the electronic device 900, and can ease processing performed by the processor 902.

Where the electronic device 900 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

The invention claimed is:

1. A system stored in a non-transitory medium executable by a processor, comprising:
    a sketch attributor configured to log associations of given sketches of a plurality of sketches with their respective ancestor sketches of the plurality of sketches, which results in an ancestor association log for each of the given sketches, wherein each sketch of the plurality of sketches is associated with a node of a plurality of nodes of a hierarchical online taxonomy, and wherein each sketch of the plurality of sketches includes a respective unique user metric of an associated node of the hierarchical online taxonomy;
    an inverter communicatively coupled to the sketch attributor, the inverter configured to invert the ancestor association log, which results in an inverted ancestor association log for each of the given sketches;
    a matcher communicatively coupled to the inverter, the matcher configured to tie descendant sketches of each of the ancestor sketches according to the inverted ancestor association log, which results in tied descendant sketches for each of the ancestor sketches, wherein two descendent sketches that are tied together are associated with nodes in a same level of the hierarchical online taxonomy; and
    a sketch combiner communicatively coupled to the matcher, the sketch combiner configured to merge each of the ancestor sketches with the corresponding tied descendant sketches, which results in merged sketches for each of the ancestor sketches, wherein the merges are based on the ancestor sketches being ancestors of the corresponding tied descendant sketches,
    wherein a merged sketch of the merged sketches comprises the two descendent sketches that are tied together and associated with nodes in the same level of the hierarchical online taxonomy and an ancestor sketch that is an ancestor to both of the two descendent sketches, and wherein the merged sketch includes recursive unique user metrics associated with the ancestor sketch and the two descendent sketches of the merged sketch.

2. The system of claim 1, wherein the online taxonomy includes an online content taxonomy.

3. The system of claim 1, further comprising:
    a communication interface configured to receive online user interaction data and online taxonomy data associated with the hierarchical online taxonomy; and
    a sketch builder communicatively coupled to the communication interface, the sketch builder configured to build the ancestor sketches and the given sketches, according to the online user interaction data and the online taxonomy data.

4. The system of claim 3, wherein the online user interaction data includes data representative of user interactions with online content.

5. The system of claim 3, the unique user metrics are online interactions.

6. The system of claim 5, wherein the hierarchical online taxonomy is associated with online content, and wherein each of the plurality of nodes of the hierarchical online taxonomy represents a corresponding content category.

7. The system of claim 1, wherein the given sketches and the ancestor sketches are hashes.

8. The system of claim 1, wherein the merged sketches are hashes.

9. The system of claim 1, wherein the merged sketches are normalized sketches.

10. A method comprising:
  logging associations of given sketches of a plurality of sketches with their respective ancestor sketches of the plurality of sketches, which results in an ancestor association log for each of the given sketches, wherein each sketch of the plurality of sketches is associated with a node of a plurality of nodes of a hierarchical online taxonomy, and wherein each sketch of the plurality of sketches includes a respective unique user metric of an associated node of the hierarchical online taxonomy;
  inverting the ancestor association log, which results in an inverted ancestor association log for each of the given sketches;
  tying descendant sketches of each of the ancestor sketches according to the inverted ancestor association log, which results in tied descendant sketches for each of the ancestor sketches, wherein two descendent sketches that are tied together are associated with nodes in a same level of the hierarchical online taxonomy;
  merging each of the ancestor sketches with the corresponding tied descendant sketches, which results in merged sketches for each of the ancestor sketches, wherein the merging is based on the ancestor sketches being ancestors of the corresponding tied descendant sketches, wherein a merged sketch of the merged sketches comprises the two descendent sketches that are tied together and associated with the nodes in the same level of the online taxonomy and an ancestor sketch that is an ancestor to both of the two descendent sketches, and wherein the merged sketch includes recursive unique user metrics associated with the ancestor sketch and the two descendent sketches of the merged sketch; and
  in response to receiving a request from a requester for the recursive unique user metrics associated with a category, determining the recursive unique user metrics according to the merged sketch corresponding to the category.

11. The method of claim 10, wherein the determination is in real time.

12. The method of claim 10, further comprising: sending, to the requester, the recursive unique user metrics.

13. The method of claim 10, wherein the requester is a client-side application.

14. The method of claim 13, wherein the client-side application is a web browser.

15. The method of claim 10, wherein the category is an online category.

16. The method of claim 15, wherein the online category is media type for delivering or presenting content.

17. The method of claim 15, wherein the online category is a content category.

18. The method of claim 17, wherein the content category is a topic.

19. A system, comprising:
  a means for associating given sketches of a plurality of sketches with their respective ancestor sketches of the plurality of sketches, which results in an ancestor association data for each of the given sketches, wherein each sketch of the plurality of sketches is associated with a node of a plurality of nodes of a hierarchical online taxonomy, and wherein each sketch of the plurality of sketches includes a respective unique user metric of an associated node of the hierarchical online taxonomy;
  a means for inverting the ancestor association data, which results in an inverted ancestor association data for each of the given sketches;
  a means for tying descendant sketches of each of the ancestor sketches according to the inverted ancestor association data, which results in tied descendant sketches for each of the ancestor sketches, wherein two descendent sketches that are tied together are associated with nodes in a same level of the hierarchical online taxonomy; and
  a means for merging each of the ancestor sketches with the corresponding tied descendant sketches, which results in merged sketches for each of the ancestor sketches, wherein the means for merging performs the merging based on the ancestor sketches being ancestors of the corresponding tied descendant sketches, wherein a merged sketch of the merged sketches comprises the two descendent sketches that are tied together and associated with the nodes in the same level of the online taxonomy and an ancestor sketch that is an ancestor to both of the two descendent sketches, and wherein the merged sketch includes recursive unique user metrics associated with the ancestor sketch and the two descendent sketches of the merged sketch.

* * * * *